July 10, 1934.  H. A. COOK  1,965,882
CHASSIS WIRING CLEAT
Filed Dec. 14, 1931

Inventor
Harry A. Cook
By Blackmore, Spencer & Flint
Attorneys

Patented July 10, 1934

UNITED STATES PATENT OFFICE 1,965,882

CHASSIS WIRING CLEAT

Harry A. Cook, Detroit, Mich., assignor to General Motors Corporation, Detroit, Mich., a corporation of Delaware Application December 14, 1931, Serial No. 580,859

2 Claims. (Cl. 248—36)

In the manufacture of motor vehicles, electric current conducting cables, pipe lines for the flow of gasoline, and other conduits, frequently extend along the chassis frame members or other supporting structures and are mounted thereon by the use of suitable anchoring connections.

The present invention relates to an improved type of attachment for this purpose and is intended to provide a device which can be manufactured at low cost and can be easily and quickly applied without the use of tools or skilled labor, and which will securely hold the conduit in place but permit its ready removal should detachment ever become desirable.

The various advantages afforded will become apparent during the course of the following specification when taken in connection with the accompanying drawing, which illustrates a preferred but not necessarily the only embodiment of the invention.

Figure 1:
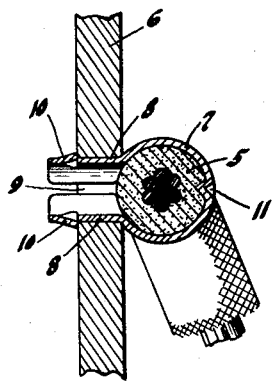
Figure 2:
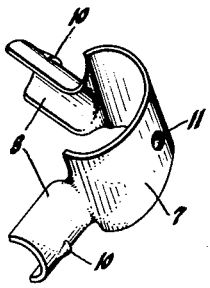

In the drawing, Figure 1 is a sectional view illustrating the attachment of a conduit to its support, and Figure 2 is a perspective view of the connector device.

Figures 3, 4, 5 and 6 illustrate the adaptation of the connector device for various kindred purposes.

Referring to the drawing, the numeral 5 indicates a conductor element, shown as an insulated electric cable, which is to be supported usually at a number of places by a chassis frame member or other support 6. Surrounding the conduit 5 is an encircling split ring or loop 7, which may be in the form of a band or wire, preferably of resilient or spring material. Its free ends are turned outwardly to form arms or legs 8 that project through an opening 9 in the supporting member 6 and in close fitting engagement with the sides of the opening. To insure maximum seating surface in an annular opening, the arms may be made semi-circular in cross section, as is illustrated, and for other shapes of openings the cross sectional form may be made to conform therewith.

As a precaution against accidental disengagement, each leg is shown provided with a stop or abutment 10 so arranged and located as to engage the far side or face of the support 6. This stop 10 may be in the nature of a projection pressed out from the material of the arm 8 and tapering back to afford, in effect, a ratchet tooth that facilitates application of the mounting device. Instead of engaging the far side of the mounting panel, the anchoring latches in some cases may be arranged to seat against pre-formed shoulders in the wall of the opening, or even allowed to bite into the material thereof. A locating dimple 11 may be formed on the inside of the conduit enclosing loop to prevent displacement and relative movement of the parts, and if provided, serves as a lug or tooth that either fits a pre-formed seat or else bites or digs into the outer surface of the conduit.

In the act of fastening a conduit to its support, the conduit is first placed within the split ring 7, by passing it between the free ends or arms 8—8, which normally are spread apart, as is seen in Figure 2. Then the loop is contracted and the free ends pressed together to allow them to enter the opening 9 previously provided in the support and which is of a size considerably smaller than the distance between the arms 8 in their normal spread apart relation so that the arms have a natural tendency to spread themselves apart, resulting in a frictional contact with the sides of the opening. As soon as the ratchet teeth 10 are moved beyond the far side of the support, the arms snap out and the teeth latch themselves or seat against the surface of the support at the far side thereof to insure against accidental separation of the parts. When a separation is necessary, the loop 7 is simply contracted or the legs 8 moved together to free the ratchet teeth 10, which permits the device to be withdrawn from the opening.

Figure 3:
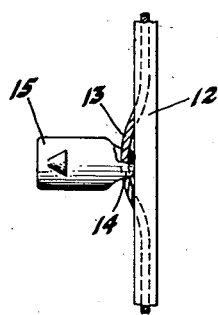
Figure 4:
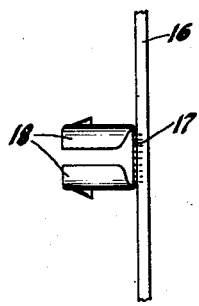
Figure 5:
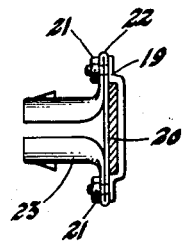
Figure 6:
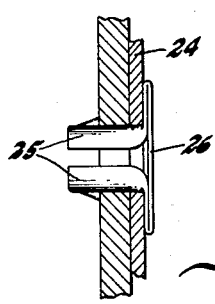

Obviously, the connector device is adapted for other uses, a few of which are illustrated by Figures 3, 4, 5 and 6. For example, in Figure 3 is shown a piece of upholstery, or a trim strip 12, having a wire or cord 13 woven or otherwise formed as a part thereof extending through the loop or bight 14 between the anchoring fingers 15, which bight is preferably of somewhat smaller size than that heretofore described. In some cases, cloth upholstery, as at 16 in Figure 4, may be sewed or otherwise secured to the bight or connecting portion 17 between the fingers 18. Furthermore, the connector device may be provided with a flat head, as in Figures 5 and 6, by bending the material in the bight upon itself and forming lateral extensions on each side. A flat head of this sort may carry the trim strip or other part to be mounted by having the same riveted or screwed thereon, or else held in place by a clip, as in Figure 5, where the numeral 19 indicates a clip receiving the trim strip 20 and being secured as by nuts 21 threaded on the clip carried studs that pass through the head 22 of the anchoring fingers 23. Instead of using the outer face of the head to carry the parts to be attached, the inside may be used, as shown in Figure 6, where the piece of material 24 is provided with an opening through which the fingers 25 extend with the enlarged head 26 engaging the face of the material 24 to hold it in place. It will be understood that the anchoring fingers in each instance are intended for projection through an opening in the support and are preferably provided with ratchet teeth to resist withdrawal.

From the above description it will be apparent that there is provided an extremely simple fastening clip of low cost, both to manufacture and to use, and which furthermore affords a reliable anchorage and promotes ease and speed of installation. It will be understood too, that the connector device described is capable of such obvious modifications as come within the scope of the appended claims.

I claim:

1. In combination, a supporting panel having a preformed circular opening therethrough, a compressible element to be mounted on said panel, and means to detachably anchor said compressible element to the panel comprising a sheet metal clip having an intermediate flat portion bent around in tight embracing relation with said compressible element and provided with a tooth biting into the element to hold it against movement longitudinally thereof within the clip, and substantially rigid end portions projected through said circular opening and of particircular cross section to fit the wall of the opening through the panel, said end portions having a transverse slit with the material on the side thereof to the extreme end pressed outwardly in inclined relation to provide a rigid stop engaging the far side of the panel and holding the clip against disengagement.

2. In combination, a support having a preformed opening therethrough, a cable, a sheet metal clip having an intermediate springy portion embracing the cable and rigid end portions projected through said opening, at least one of said end portions having therein a transverse slit immediately adjacent the rear face of said support and the material of the sheet metal end portion being pressed outwardly on the side of the slit toward the extreme end thereof to provide a rigid stop engaging the support and an inclined ramp leading to the outwardly pressed edge of the slit.

HARRY A. COOK.